(12) United States Patent
Jiang (10) Patent No.: US 11,554,502 B2
(45) Date of Patent: Jan. 17, 2023

(54) ANNULAR COMPONENT INSTALLATION SYSTEM AND METHOD

(71) Applicant: The Boeing Company, Chicago, IL (US)

(72) Inventor: Wen Jiang, Portland, OR (US)

(73) Assignee: The Boeing Company, Chicago, IL (US)

( * ) Notice: Subject to any disclaimer, the term of this patent is extended or adjusted under 35 U.S.C. 154(b) by 322 days.

(21) Appl. No.: 16/860,495

(22) Filed: Apr. 28, 2020

(65) Prior Publication Data

US 2021/0331330 A1 Oct. 28, 2021

(51) Int. Cl.
| | | |
|---|---|---|
| *B25J 9/16* | (2006.01) | |
| *B25J 15/00* | (2006.01) | |
| *B25J 9/12* | (2006.01) | |
| *B25J 13/08* | (2006.01) | |
| *B25J 15/02* | (2006.01) | |
| *B25J 19/02* | (2006.01) | |

(52) U.S. Cl.
CPC ......... *B25J 15/0019* (2013.01); *B25J 9/123* (2013.01); *B25J 9/161* (2013.01); *B25J 9/1679* (2013.01); *B25J 9/1694* (2013.01); *B25J 13/087* (2013.01); *B25J 15/02* (2013.01); *B25J 19/02* (2013.01)

(58) Field of Classification Search
CPC ........ B25J 15/0019; B25J 9/123; B25J 9/161; B25J 9/1679; B25J 9/1694; B25J 13/087; B25J 15/02; B25J 19/02; B25J 9/1687; B25J 11/005; B23P 11/025; G05B 2219/37431; G05B 2219/40032; B64F 5/10; B29C 65/18; B29C 65/002
See application file for complete search history.

(56) References Cited

U.S. PATENT DOCUMENTS

| | | | |
|---|---|---|---|
| 2003/0168853 A1 | 9/2003 | Mueller et al. | |
| 2016/0271742 A1* | 9/2016 | Dautel | B23P 11/025 |

FOREIGN PATENT DOCUMENTS

| | | |
|---|---|---|
| EP | 0 709 744 | 5/1996 |
| EP | 3 176 925 | 6/2017 |

OTHER PUBLICATIONS

Extended European Search Report dated Sep. 21, 2021, in corresponding European application No. 21170078.6.

* cited by examiner

*Primary Examiner* — Bao Long T Nguyen
(74) *Attorney, Agent, or Firm* — Womble Bond Dickinson (US) LLP (57) ABSTRACT

A component installation system includes an engagement clamp having a circular shape coupled to a robotic arm, being configured to engage an annular component. The component installation system further includes an actuator coupled to the engagement clamp and operable to cause the engagement clamp to engage and disengage the annular component, and a heating element coupled to the engagement clamp and arranged to heat the annular component engaged within the engagement clamp. The component installation system further includes a controller in communication with the robotic arm, the actuator and the heating element.

23 Claims, 11 Drawing Sheets

ANNULAR COMPONENT INSTALLATION SYSTEM AND METHOD

BACKGROUND

Field of the Disclosure

The present disclosure relates to a method and system for an annular component installation about a work-piece.

Description of Related Art

Annular components such as bushings are often installed in aircraft systems and other industrial machinery to reduce or elimination vibrations and for other purposes. In some instances, center bushings are installed in work-pieces, such as in Torque Tube assemblies used in aircrafts for use with wheel wells, high lift devices, braking systems, and so on. In further instances, torque tubes are employed to mechanically transmit torque from a driver to a driven device.

Such center bushings are typically installed by pre-heating the bushing and then manually inserting the bushing about the torque tube. Operators generally have to manually handle the high temperature pre-heated bushing prior to installation, which is a safety concern. In addition, the operators in some instances need to manually place the work-piece at awkward angles and install center bushings about the work-pieces, which can inherently lead to errors and defects in workmanship. In addition, such installations sometimes return in rework and experience failures because of the manual steps involved in heating and maintaining the bushing at a fixed location on the work-piece. In other instances, there is variability in bushing installations as different operators tend to locate the bushing about the work-piece differently. There is also a problem with operator fatigue in handling heavy pieces of machinery.

Thus, there is a need for an annular component installation system and method for installing the same about a work-piece that reduces installation time, improves safety, reduces labor, is easily automated and minimizes wastage of parts.

SUMMARY

The above and other needs are met by aspects of the present disclosure which, in one aspect, provides a component installation system. The component installation system includes an engagement clamp having a circular shape coupled to a robotic arm. The engagement clamp is configured to engage an annular component. An actuator coupled to the engagement clamp is capable of causing the engagement clamp to engage and disengage the annular component. A heating element coupled to the engagement clamp is arranged to heat the annular component engaged within the engagement clamp. The component installation system further includes a controller in communication with the robotic arm, the actuator and the heating element. The controller includes a processor and a memory with computer-readable instructions. The computer-readable instructions when executed by the processor cause the controller to: actuate the actuator to cause the engagement clamp to engage the annular component, actuate the heating element to heat the annular component within the engagement clamp, deactuate the heating element, direct the robotic arm and the engagement clamp to position the heated annular component at an installation position relative to a work-piece, maintain the annular component at the installation position with the heating element deactuated, such that the annular component engages the work-piece upon cooling, and deactuate the actuator to cause the engagement clamp to disengage the annular component.

Another aspect of the disclosure provides a method of coupling an annular component to a work-piece using an installation system. The installation system includes a robotic arm having an engagement clamp engaged with a distal end of the robotic arm. The method includes actuating an actuator coupled to the engagement clamp configured to cause the engagement clamp to engage the annular component and actuating a heating element coupled to the engagement clamp to heat the annular component engaged within the engagement clamp. The heated annular component is positioned by directing movement of the robotic arm with the engagement clamp at an installation position relative to the work-piece, and the annular component is maintained at the installation position with the heating element deactuated, such that the annular component engages the work-piece upon cooling. The actuator is then deactuated to direct the engagement clamp to disengage the annular component.

These and other features, aspects, and advantages of the present disclosure will be apparent from a reading of the following detailed description together with the accompanying drawings, which are briefly described below. The present disclosure includes any combination of two, three, four, or more features or elements set forth in this disclosure, regardless of whether such features or elements are expressly combined or otherwise recited in a specific embodiment description herein. This disclosure is intended to be read holistically such that any separable features or elements of the disclosure, in any of its aspects and embodiments, should be viewed as intended, namely to be combinable, unless the context of the disclosure clearly dictates otherwise.

It will be appreciated that the summary herein is provided merely for purposes of summarizing some example aspects so as to provide a basic understanding of the disclosure. As such, it will be appreciated that the above described example aspects are merely examples and should not be construed to narrow the scope or spirit of the disclosure in any way. It will be appreciated that the scope of the disclosure encompasses many potential aspects, some of which will be further described below, in addition to those herein summarized. Further, other aspects and advantages of such aspects disclosed herein will become apparent from the following detailed description taken in conjunction with the accompanying drawings which illustrate, by way of example, the principles of the described aspects.

BRIEF DESCRIPTION OF THE SEVERAL VIEWS OF THE DRAWING(S)

Having thus described the disclosure in general terms, reference will now be made to the accompanying drawings, which are not necessarily drawn to scale, and wherein:

DETAILED DESCRIPTION OF THE DISCLOSURE

The present disclosure now will be described more fully hereinafter with reference to the accompanying drawings, in which some, but not all aspects of the disclosure are shown. Indeed, the disclosure may be embodied in many different forms and should not be construed as limited to the aspects set forth herein; rather, these aspects are provided so that this disclosure will be thorough and complete, will fully convey the scope of the disclosure to those skilled in the art, and will satisfy applicable legal requirements. Like numbers refer to like elements throughout. As used in this specification and the claims, the singular forms "a," "an," and "the" include plural referents unless the context clearly dictates otherwise.

FIGS. 1-10 illustrate systems and methods for a component installation system 100 for installing a component 120 about a work-piece 200, in accordance with one or more embodiments of this disclosure. In various embodiments, the component installation system 100 is applicable to aircraft components, which in one example, is particularly applicable to installing a bushing about a torque tube for an aircraft wheel well. In other embodiments, the component installation system 100 finds use in other applications, such as other structural components or portions of the aircraft or structural components for automobiles, boats, ships, and so on. In general, the component 120 is an annular component that is installed about a cylindrical work-piece 200, although the component installation system 100 could include components alternatively shaped, arranged, or configured without departing from the disclosure.

Figure 1:
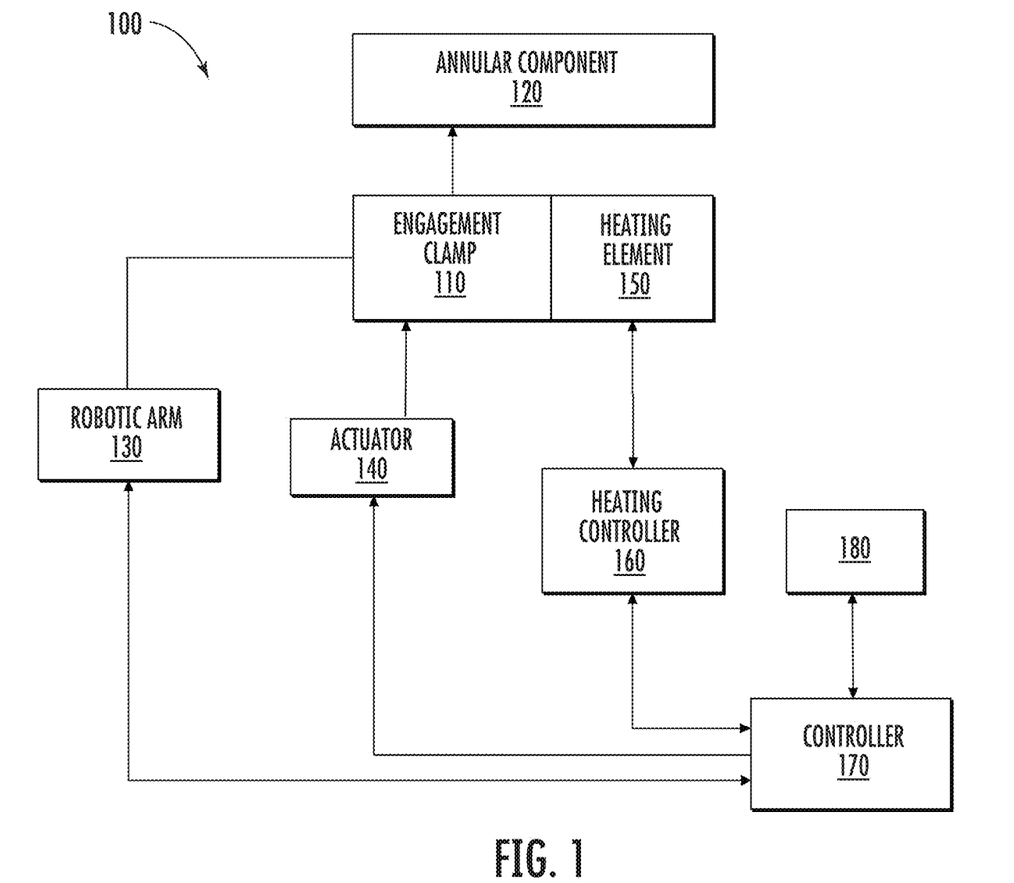
FIG. 1 schematically illustrates an example component installation system, according to one aspect of the present disclosure.
Figure 2:
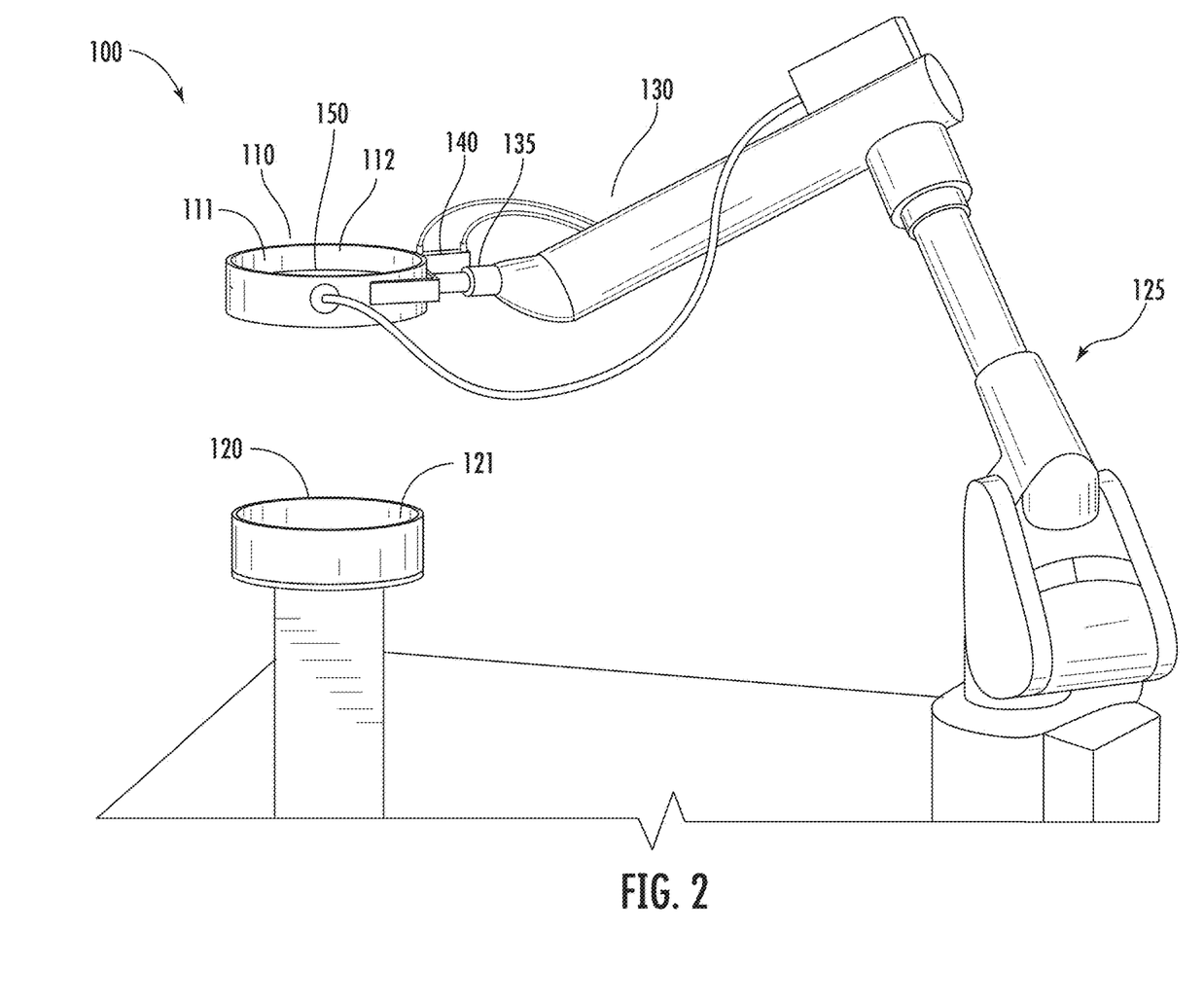
FIG. 2 illustrates a perspective view of an example configuration of a component installation system, according to one aspect of the present disclosure.
Figure 10:
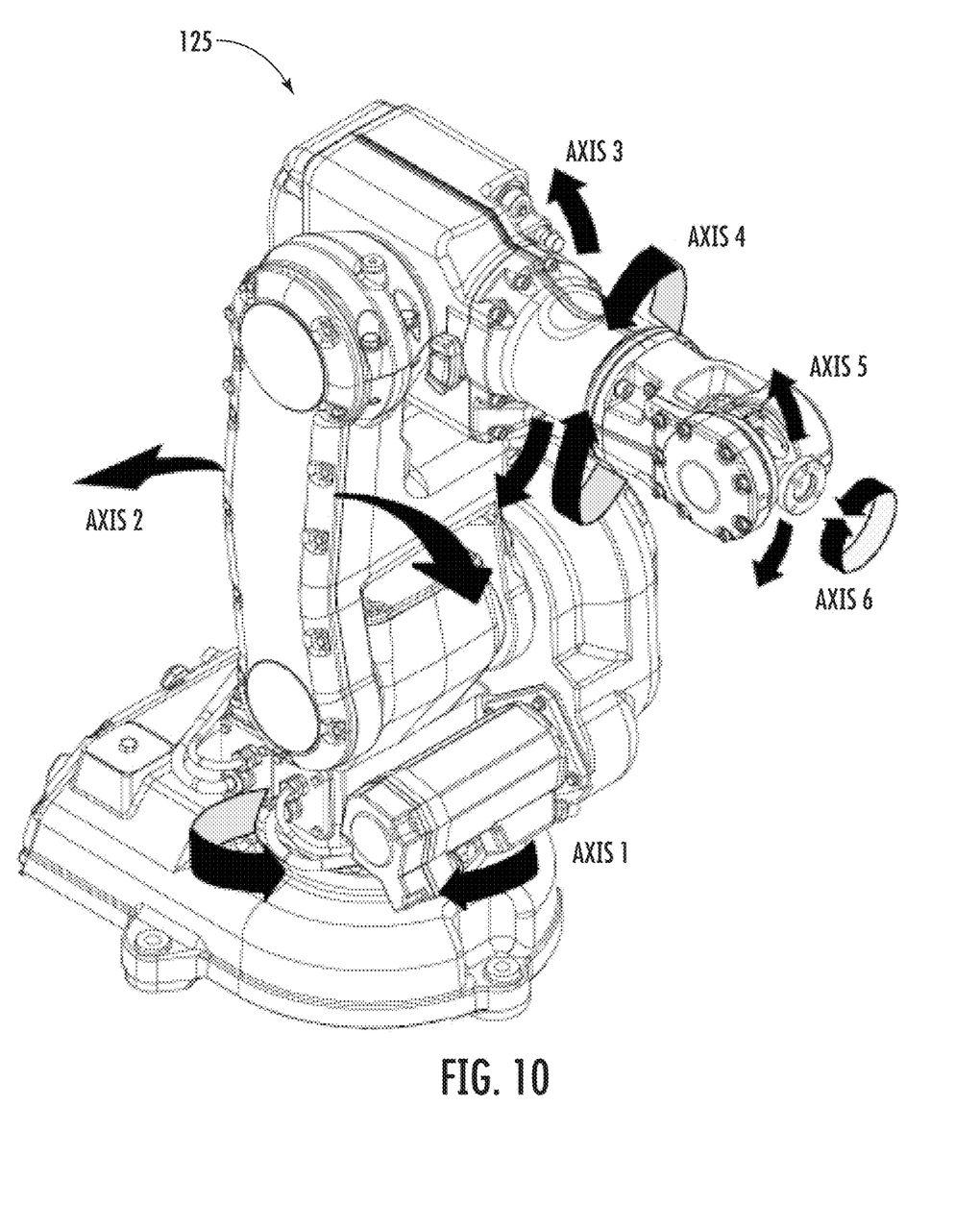
FIG. 10 illustrates a perspective view of an example robot for use with the component installation system, according to one aspect of the present disclosure.

Referring now to FIGS. 1-2, schematic and perspective views of the component installation system 100 are respectively illustrated. The component installation system 100 includes an engagement clamp 110 coupled to a distal end 135 of a robotic arm 130 of a robot 125. The robot 125 is generally indicated in FIG. 10 having six axes or six degrees of motion. In general, the engagement clamp 110 has a circular shape and includes an opening 111 adapted to receive and engage the annular component 120 about a circumference thereof. The annular component 120 includes an opening 121 configured to allow the annular component 120 to be received about the circumference of the work-piece 200 (shown in FIGS. 5-6). In an embodiment, the annular component 120 includes a bushing configured to be received about a work-piece 200 including a torque tube for an aircraft wheel well such that the bushing extends about the torque tube. In such an instance, the engagement clamp 110 includes a collar having a circular sidewall configured to extend about the bushing.

Referring again to FIG. 1-2, in an embodiment, the annular component 120 defines an external circumference, and a heating element 150 coupled to the engagement clamp 110 is arranged to heat the annular component 120 received in and engaged with the engagement clamp 110. The component installation system 100 further includes an actuator 140 coupled to the engagement clamp 110. The actuator 140 is arranged to cause the engagement clamp 110 to engage and disengage the annular component 120. The component installation system 100 further includes one or more controllers, such as a controller 170, that is in communication with the robotic arm 130, the actuator 140, and the heating element 150. In an embodiment, the component installation system includes an optional heating controller 160 that controls the heating element 150. In embodiments, the heating controller 160 is independent of the controller 170. The terms "controller" and "control system" is used interchangeably throughout this disclosure. The component installation system 100 further includes a Human Machine Interface (HMI) or computer 180.

Referring to FIG. 1, In embodiments, the controller 170 and the heating controller 160 are communicatively coupled to send and/or receive signals via a communication interface. For instance, the controller 170 sends signals to the robotic arm 130, the actuator 140, and the optional heating controller 160. In another example, the heating controller 160 sends command signals to the heating element 150 to initiate heating and receives a temperature signal. The communication interface includes one or more communication networks such as, for example, an Ethernet interface, a Universal Serial Bus (USB) interface, or a wireless interface. In certain embodiments, the controller 170 is coupled to the robotic arm 130, the actuator 140, and/or the heating controller 160 by way of a hard wire or cable, such as, for example, an interface cable. Similarly, the heating controller 160 can be hardwired to the heating element 150. In embodiments, the controller 170 includes a computer system having one or more processors and a memory with computer-readable instructions.

Figure 3:
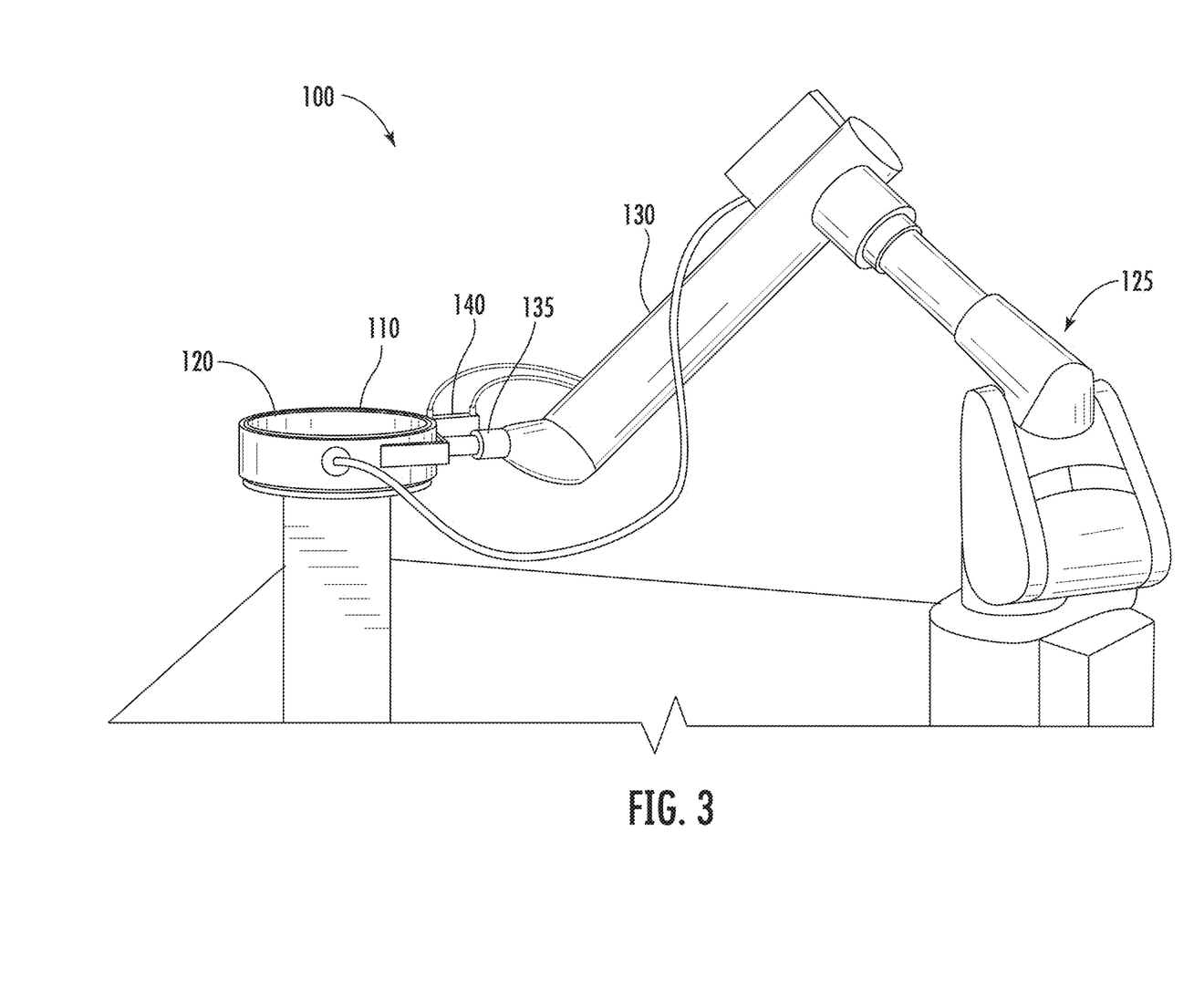
FIGS. 3-6 schematically illustrate an example process of installing an annular component about a work-piece, according to one aspect of the present disclosure.
Figure 4:
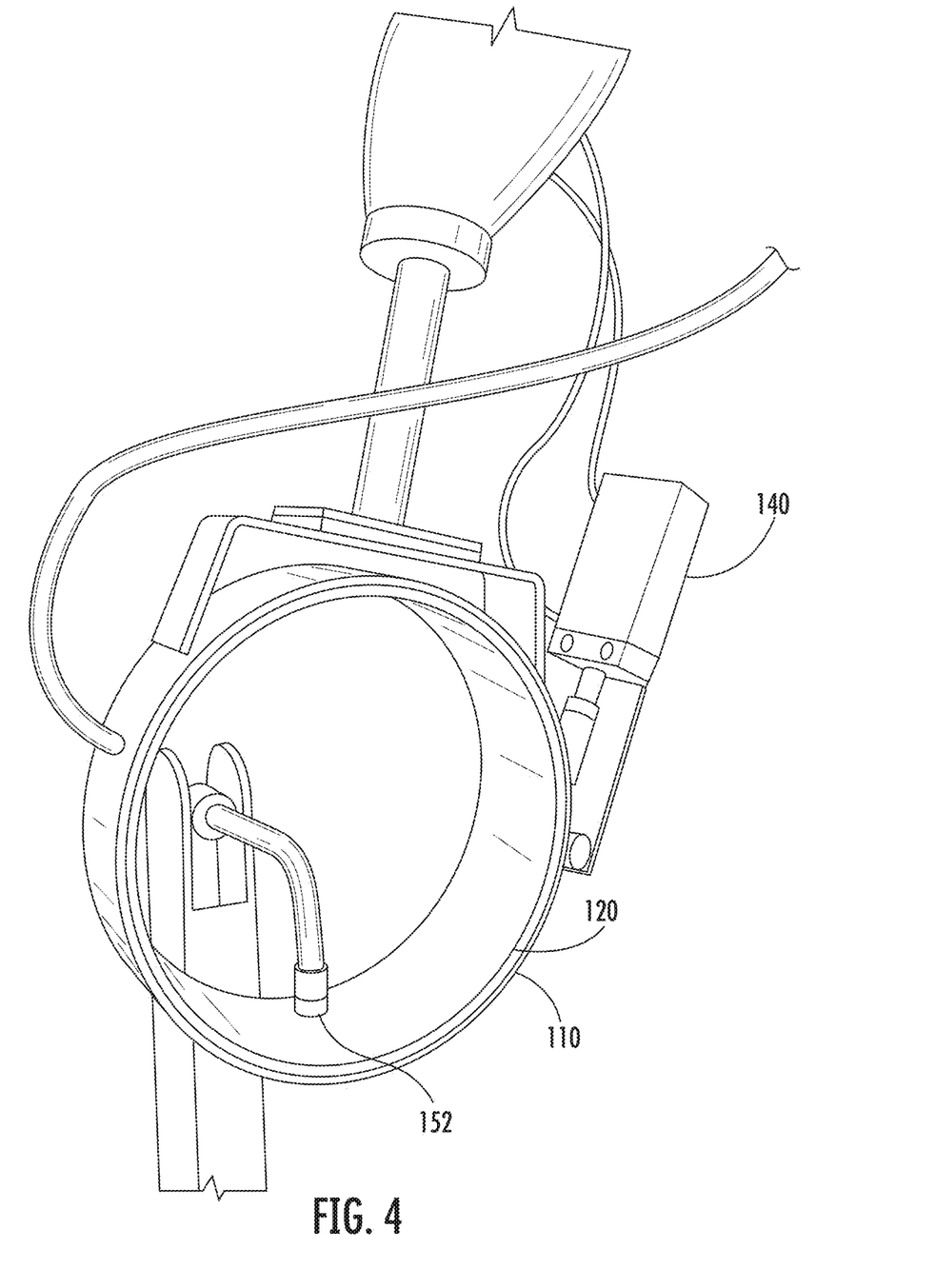
Figure 5:
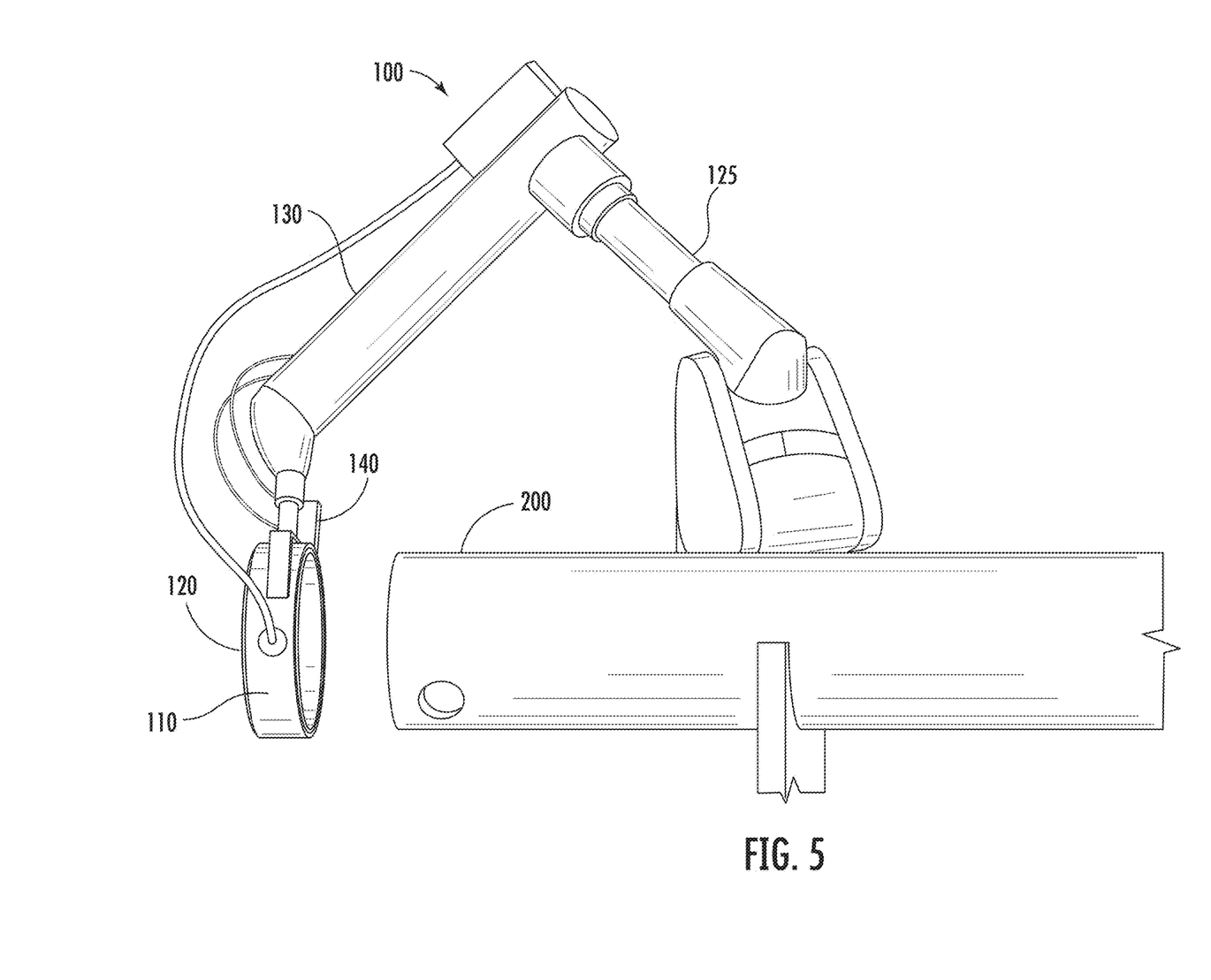

FIGS. 2-6 illustrate perspective views of the component installation system 100 when the computer-readable instructions, executed by the processor, cause the controller 170 to perform various actions. For example, the computer-readable instructions are capable of causing the controller 170 to direct the movement of the robotic arm 130 to position the engagement clamp 110 over an uninstalled annular component 120 before the engagement clamp 110 engages the annular component 120 (FIG. 2) or to direct the movement of the robotic arm 130 to move the engagement clamp 110 away from the installed annular component 120 after the engagement clamp 110 disengages from the annular component 120 (not shown). Once the engagement clamp 110 is positioned over the annular component 120, the computer-readable instructions when executed cause the controller 170 to actuate the actuator 140 to cause the engagement clamp 110 to engage the annular component 120 (FIG. 3: e.g., radially contract so as to engage the annular component 120 about a circumference thereof). Once the annular component 120 is engaged within the engagement clamp 110, the computer-readable instructions when executed actuate the heating element 150 to heat the annular component 120 within the engagement clamp 110 (FIGS. 3-4). In an embodiment, the controller 170 directs the heating controller 160 to actuate the heating element 150 to heat the annular component 120 within the engagement clamp 110. In another embodiment, the heating controller 160 is directly connected to the HMI 180 and the heating controller 160 actuates the heating element 150 to heat the annular component 120 within the engagement clamp 110.

In an embodiment, the computer-readable instructions cause the controller 170 to direct the robotic arm 130 to move the annular component 120 into interaction with a sensor 152 (FIG. 4) configured to generate a signal indicative of a temperature of the annular component 120, and further cause the controller 170 or the heating controller 160 to direct the heating element 150 to heat the annular component 120 based at least in part on the signal generated by the sensor 152. When the annular component 120 within the engagement clamp 110 is heated, the engagement clamp 110 allows even circumferential expansion of the annular component 120 within the engagement clamp 110. The engagement clamp 110 controls that expansion of the annular component 120 to prevent any warping or distortion of the annular component 120 during heating. In another embodiment, the computer-readable instructions further cause the controller 170 or the heating controller 160 to control the heating element 150 to heat the annular component 120 and to monitor the sensor to detect when the annular component 120 has been heated to a predetermined temperature of at least about 485° F.

Figure 8:
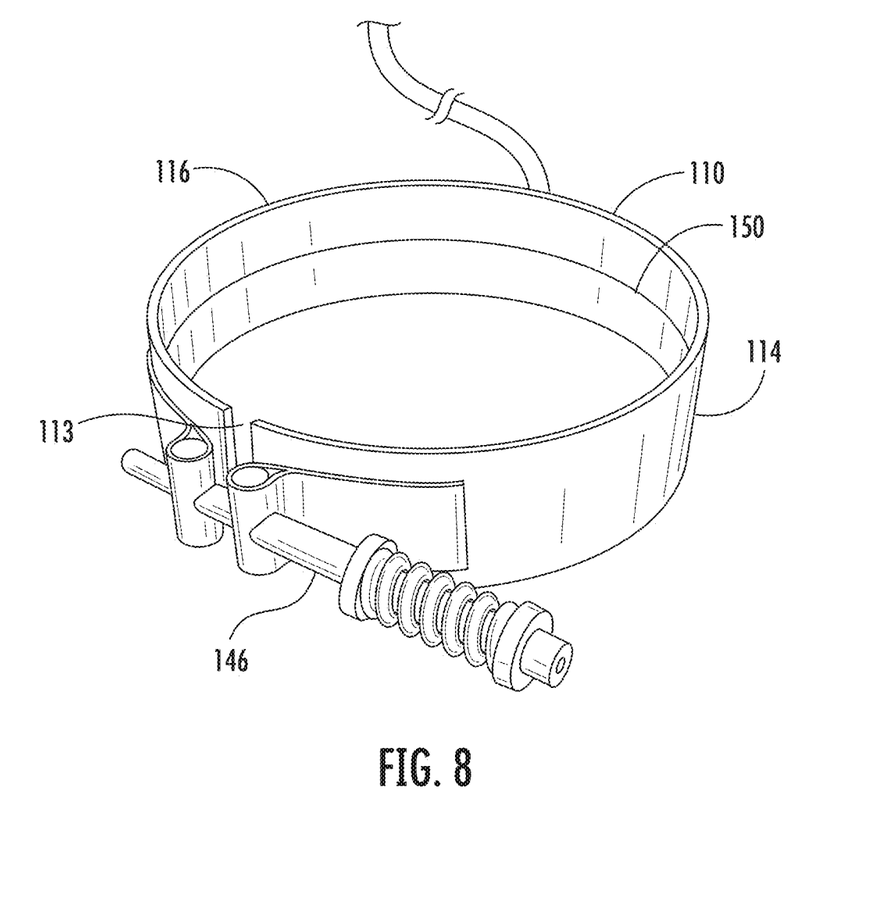
FIG. 8 illustrates a perspective view of another example engagement clamp and another example actuator for the component installation system, according to one aspect of the present disclosure.

Referring now to FIGS. 2 and 8, the heating element 150 is represented in the form of a thin strip embedded circumferentially on the inside sidewall surface of the engagement clamp 110, although the heating element 150 may be shaped, sized or configured in a different arrangement without departing from the disclosure. The heating element 150 is configured to transfer heat from the engagement clamp 110 to the annular component 120 via conduction. In embodiments, the heating element 150 is integral with the engagement clamp 110, although the heating element 150 may be attached to the engagement clamp 110 or the annular component 120 without departing from the disclosure.

The computer-readable instructions, in some instances, further cause the controller 170 or the heating controller 160 to deactuate the heating element 150. Deactuation of the heating element 150 is based on the annular component 120 reaching the predetermined temperature or is based on other parameters, such as a predetermined heating time being reached or a second sensor indicating expansion of the annular component 120 within the engagement clamp 110. Once the heating element 150 is deactuated and/or the annular component 120 attains the predetermined temperature, the computer-readable instructions further cause the controller 170 to direct the robotic arm 130 and the engagement clamp 110 to position the heated annular component 120 at an installation position relative to a work-piece 200 (FIG. 6).

Referring again to FIG. 4, in certain embodiments, the sensor 152 is positioned adjacent to the work-piece 200, at less than a minimum distance from the work-piece 200 (e.g., a travel distance of 4 feet or less). Once the controller 170 or the heating controller 160 configured to monitor the sensor 152 detects that the annular component 120 is heated by the heating element 150 to the predetermined temperature, the computer-readable instructions then cause the controller 170 to control the robotic arm 130 to move the engagement clamp 110 and the annular component 120 from the sensor 152 to the installation position at the work-piece 200, to thereby minimize the time duration for positioning the heated annular component 120 about the work-piece 200, such that the heated annular component 120 does not cool and contract to an extent that it's thermally expanded inside diameter would not fit over the work piece.

Figure 6:
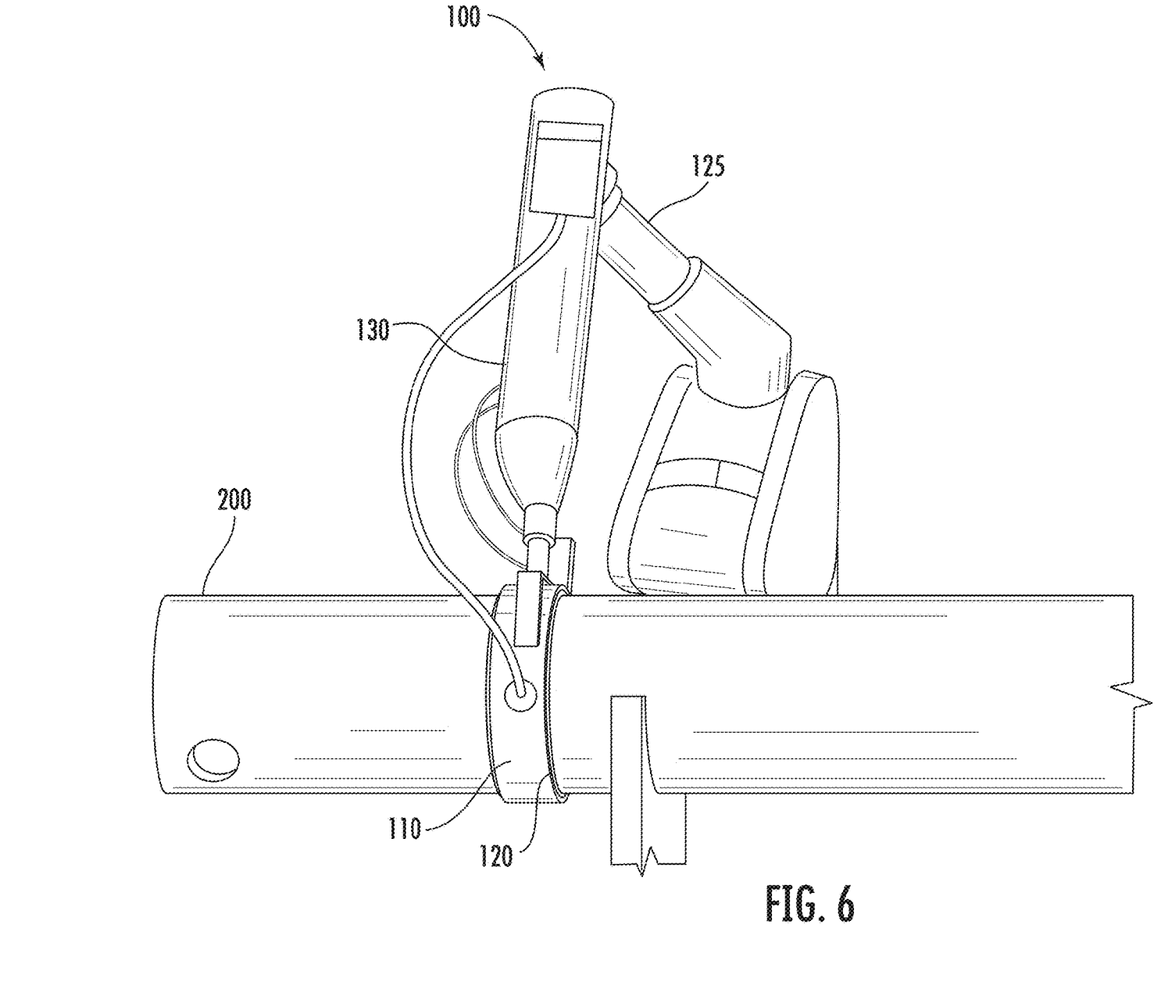

Once the heating element 150 is deactuated, the computer-readable instructions further cause the controller 170 to maintain the annular component 120 at the installation position, such that the annular component 120 engages the work-piece upon cooling (FIG. 6). In some instances, the amount of time to maintain the annular component 120 at the installation position is based on a predetermined time to allow cooling of annular component 120. In some embodiments, the computer-readable instructions cause the controller 170 to maintain the annular component 120 at the installation position until radial contraction of the annular component 120 causes an interference fit between the annular component 120 and the work-piece 200 upon cooling of the annular component 120.

The work-piece 200 may include a torque tube for an aircraft, comprising two ends that are seam welded together, where the annular component 120 can be positioned over the weld seam to provide reinforcement of the welded seam, for example, when the annular component 120 includes the bushing and the work-piece includes the torque tube for the aircraft wheel well such that the bushing extends about the torque tube, the computer-readable instructions cause the controller 170 to deactuate the heating element 150 and direct the robotic arm 130 to move the engagement clamp 110 to position the heated annular component 120 (the bushing) at an installation position relative to the torque tube and maintain the bushing at the installation position about the torque tube until radial contraction of the bushing causes an interference fit between the bushing and the torque tube upon cooling of the bushing.

Once the heating element 150 is deactuated and the pre-determined time to maintain the annular component 120 at the installation position is reached or the interference fit between the annular component 120 and the work-piece 200 is established, the computer-readable instructions cause the controller 170 to deactuate the actuator 140 to cause the engagement clamp 110 to disengage the annular component 120 and to direct the movement of the robotic arm 130 to move the engagement clamp 110 away from the annular component 120 after the engagement clamp 110 disengages from the annular component 120.

Figure 7A:
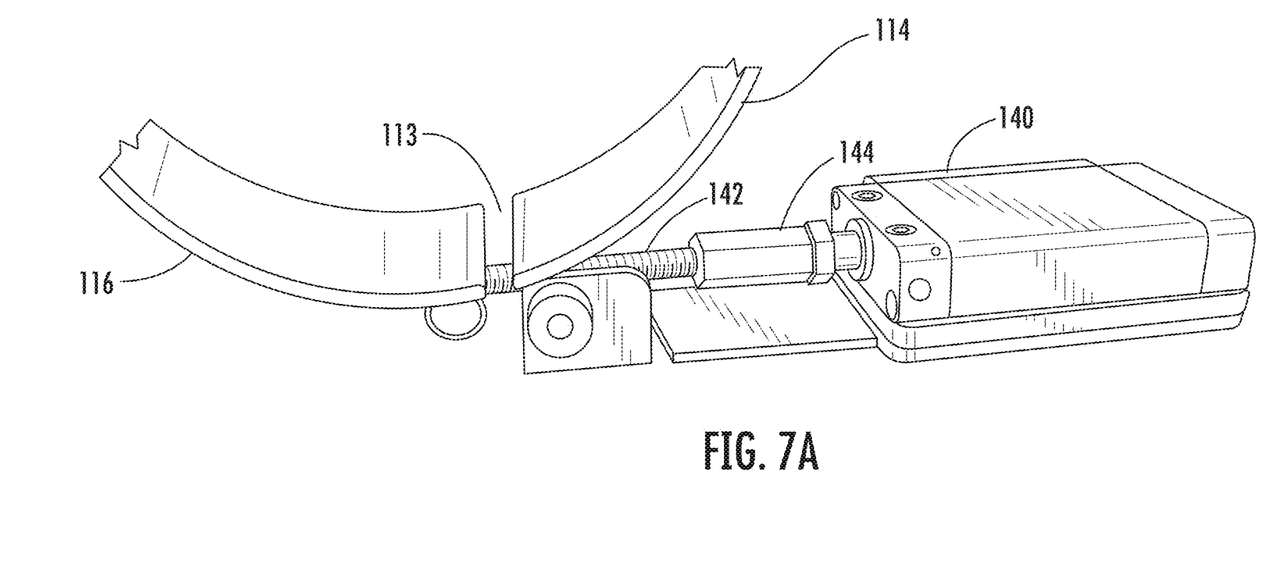
FIG. 7A illustrates a perspective view of an example engagement clamp and an example actuator for the component installation system in an engaged position, according to one aspect of the present disclosure.
Figure 7B:
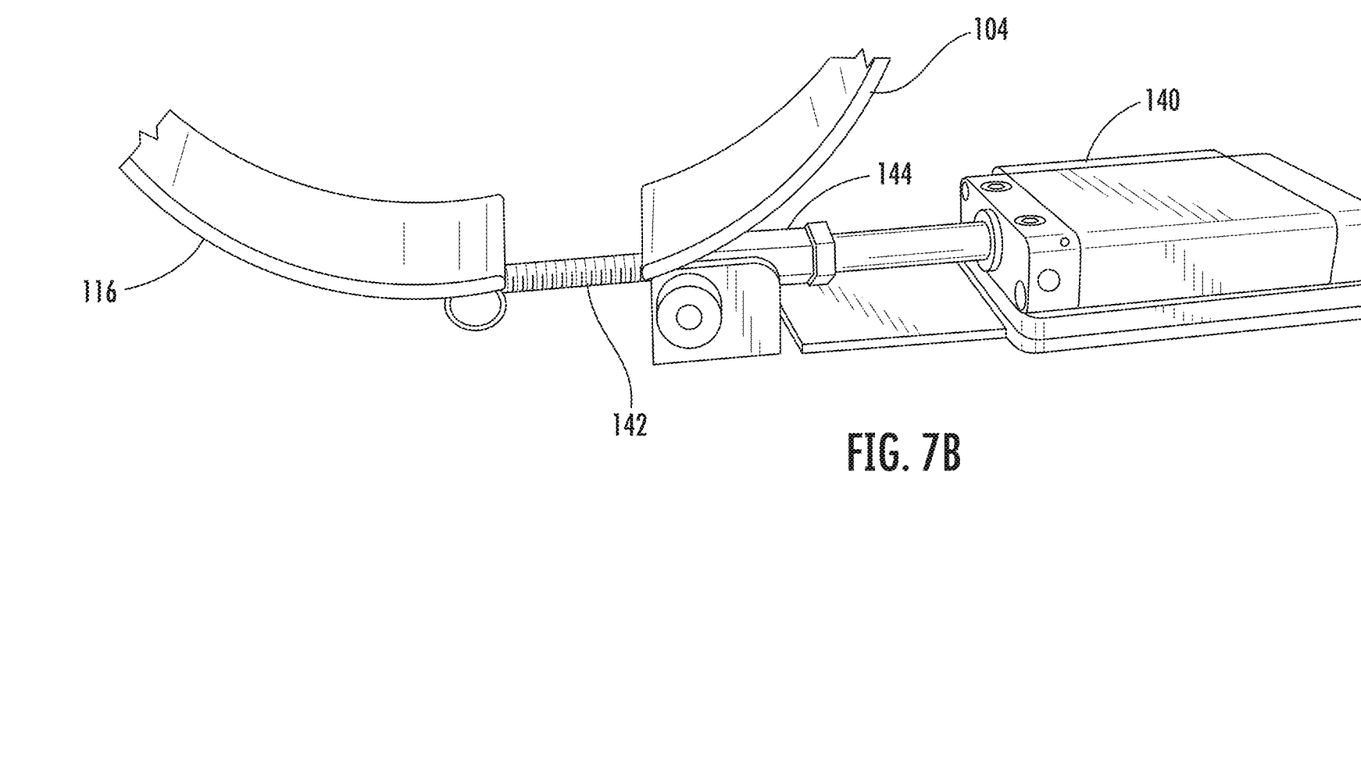
FIG. 7B illustrates a perspective view of the example engagement clamp and the example actuator for the component installation system in a disengaged position, according to one aspect of the present disclosure.

Referring now to FIG. 2-6, and further referring to FIGS. 7A, 7B, and 8, in some embodiments, the engagement clamp 110 includes a split collar 113 having a circular sidewall 112 with spaced-apart first 114 and second 116 sidewall ends. When the actuator 140 is actuated, the actuator 140 pulls the first sidewall end 114 toward the second sidewall end 116 to radially reduce the diameter of the split collar 113 such that the split collar 113 contracts about and engages the annular component 120. The actuator 140 includes an electrically operated linear actuator as illustrated in FIG. 3A-3B, although the actuator 140 could include hydraulically or pneumatically operated actuators and can include rotary actuators without departing from the disclosure. The actuator 140 of FIGS. 3A and 3B is located proximate the first sidewall end 114. The actuator 140 includes an extensible inner rod 146 coupled to the second sidewall end 116. The actuator 140 includes a rotating a spindle or lead screw 142 that allows the inner rod 146 to retract to pull the first 114 and the second 116 sidewall ends towards each other to engage the annular component 120 (FIG. 3A) or extend to push the first 114 and the second 116 sidewall ends away from each other to disengage the annular component 120 (FIG. 3B). As illustrated in FIG. 4, in some embodiments, the engagement clamp 110 has a manual locking mechanism 146 configured to engage and disengage the annular component 120 within the engagement clamp 110.

Figure 9:
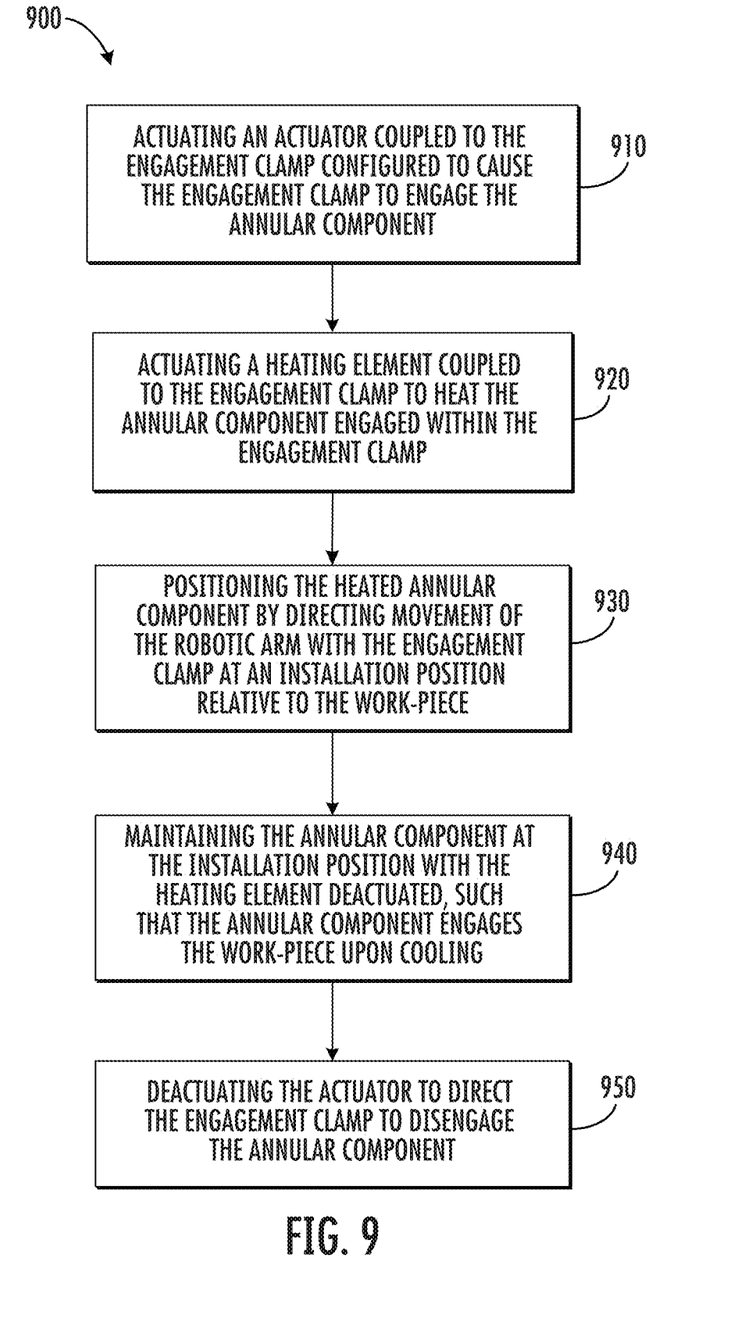
FIG. 9 is a flowchart of the example process of installing the annular component about the work-piece, according to one aspect of the present disclosure.

In accordance with the foregoing, other aspects of the present disclosure provide a method 900 of coupling an annular component 120 to a work-piece 200 using an installation system 100 comprising a robotic arm 130 having an engagement clamp 110 engaged with a distal end 135 thereof, as shown for example in FIG. 9, and as further indicated in FIGS. 2-6. In such aspects, the method 900 includes a step 910 of actuating an actuator 140 coupled to the engagement clamp 110 configured to cause the engagement clamp 110 to engage the annular component 120 (FIG. 3). In certain embodiments, the method 900 also includes the step of directing the movement of the robotic arm 130 to position the engagement clamp 110 over the annular component 120 before the engagement clamp 110 engages the annular component 120. In certain embodiments, the method 900 includes the step of coupling a controller 170 with the robotic arm 130, the engagement clamp 110, the actuator 140, and the heating element 150, wherein the controller 170 comprises a processor and a memory with computer-readable instructions executable by the processor to cause the controller 170 to control the robotic arm 130, the engagement clamp 110, the actuator 140, and the heating element 150. In certain embodiments, a heating controller 160 may control certain aspects of the heating element 150. In certain embodiments, the engagement clamp 110 comprises a split collar having a circular sidewall with spaced-apart first 114 and second 116 sidewall ends (FIGS. 7A-7B and 8). In such instances, engaging the annular component 120 includes actuating the actuator 140 to pull the first sidewall end 114 toward the second sidewall end 116 to radially reduce the split collar such that the split collar contracts about and engages the annular component 120, and directing the engagement clamp 110 to disengage the annular component 120 includes deactuating the actuator 140 to cause movement of the first sidewall end 114 away from the second sidewall end 116 to radially expand the split collar such that the split collar expands and disengages from the annular component 120. In certain embodiments, the actuator 140 actuator includes a linear actuator disposed proximate the first sidewall end 114, having an extendable rod 144 coupled to the second sidewall end 116, wherein actuating the actuator 140 to disengage the annular component 120 comprises actuating the linear actuator to retract the rod 144 to pull the first 114 and second 116 sidewall ends towards each other to engage the annular component 120.

The method 900 further includes a step 920 of actuating a heating element 150 coupled to the engagement clamp 110 to heat the annular component 120 engaged within the engagement clamp 110. In certain embodiments, the step of actuating the heating element 150 includes receiving a signal from a sensor 152 indicative of a temperature of the annular component 120, and based at least in part on the signal, actuating the heating element 150 to heat the annular component 120 (FIG. 4). In another embodiment, the step of actuating the heating element 150 includes controlling the heating element 150 to heat the annular component 120 and monitoring the sensor 152 to detect when the annular component 120 has been heated to a pre-determined temperature of at least 485° F. In certain embodiments, the method 900 at step 920 includes a further step of actuating the actuator 140 to extend the engagement clamp 110 about a circumference of the annular component 120 and a step of actuating the heating element 150 coupled to the engagement clamp 110 so as to heat the annular component 120 about its circumference.

The method 900 further includes a step 930 of positioning the heated annular component 120 by directing movement of the robotic arm 130 with the engagement clamp 110 at an installation position relative to the work-piece 200 (FIG. 6). In an embodiment, the method at step 930 further includes positioning the heated annular component 120 including a bushing, where the engagement clamp 110 includes an engagement collar configured to extend about the bushing, at an installation position with the bushing extending about the work-piece 200 including a torque tube for an aircraft wheel well.

The method 900 further includes a step 940 of maintaining the annular component 120 at the installation position with the heating element 150 deactuated, such that the annular component 120 engages the work-piece 200 upon cooling. In certain embodiments, the method 900 at step 940 includes deactuating the heating element 150 and moving the robotic arm 130 to position the engagement clamp 110 holding the annular component 120 to an installation position on the work-piece 200 while maintaining the annular component 120 at the installation position until cooling of the annular component 120 results in radial contraction of the annular component 120 that causes an interference fit between the annular component 120 and the work-piece 200. In certain other embodiments, the method 900 at step 940 includes deactuating the heating element 150 and directing movement of the robotic arm 130 to move the engagement clamp 110 to position the heated annular component 120 at an installation position on the work-piece 200 while maintaining the bushing at the installation position about the torque tube until cooling of the bushing results in radial contraction of the bushing and causes an interference fit between the bushing and the torque tube.

The method 900 further includes a step 950 of deactuating the actuator 140 to direct the engagement clamp 110 to disengage the annular component 120. Once the engagement clamp 110 disengages from the annular component 120, in some embodiments, the method 900 further includes directing the movement of the robotic arm 130 to move the engagement clamp 110 away from the annular component 120.

The present disclosure thus includes, without limitation, the following clauses:

Clause 1: A component installation system, comprising: an engagement clamp having a circular shape coupled to a robotic arm, being configured to engage an annular component; an actuator coupled to the engagement clamp and operable to cause the engagement clamp to engage and disengage the annular component; a heating element coupled to the engagement clamp and arranged to heat the annular component engaged within the engagement clamp; a controller in communication with the robotic arm, the actuator and the heating element, the controller comprising a processor and a memory with computer-readable instructions, the computer-readable instructions when executed by the processor causing the controller to: actuate the actuator to cause the engagement clamp to engage the annular component; actuate the heating element to heat the annular component within the engagement clamp; deactuate the heating element; direct the robotic arm and the engagement clamp to position the heated annular component at an installation position relative to a work-piece; maintain the annular component at the installation position with the heating element deactuated, such that the annular component engages the work-piece upon cooling; and deactuate the actuator to cause the engagement clamp to disengage the annular component.

Clause 2: The component installation system of Clause 1, wherein the computer-readable instructions, when executed by the processor, further cause the controller to: direct the movement of the robotic arm to position the engagement clamp over the annular component before the engagement clamp engages the annular component; or direct the movement of the robotic arm to move the engagement clamp away from the annular component after the engagement clamp disengages from the annular component.

Clause 3: The component installation system of Clause 1, wherein the annular component comprises a bushing configured to be received about the work-piece comprising a torque tube for an aircraft wheel well such that the bushing extends about the torque tube, and wherein the engagement clamp comprises a collar having a circular sidewall configured to extend about the bushing.

Clause 4: The component installation system of Clause 1, wherein the engagement clamp is configured to extend about a circumference of the annular component, and wherein the heating element is coupled with the engagement clamp so as to heat the annular component about the circumference thereof.

Clause 5: The component installation system of Clause 1, wherein the engagement clamp comprises a split collar having a circular sidewall with spaced-apart first and second sidewall ends, wherein actuation of the actuator pulls the first sidewall end toward the second sidewall end to radially reduce the diameter of the split collar such that the split collar contracts about and engages the annular component, and wherein deactuation of the actuator causes movement of the first sidewall end away from the second sidewall end to radially expand the split collar such that the split collar expands and disengages from the annular component.

Clause 6: The component installation system of Clause 1, wherein the computer-readable instructions, when executed by the processor, further cause the controller to direct the robotic arm to move the annular component into interaction with a sensor configured to generate a signal indicative of a temperature of the annular component, and wherein the computer-readable instructions, when executed by the processor, further cause the controller to direct the heating element to heat the annular component based at least in part on the signal generated by the sensor.

Clause 7: The component installation system of Clause 6, wherein the computer-readable instructions, when executed by the processor, further cause the controller to control the heating element to heat the annular component and to monitor the sensor to detect when the annular component has been heated to a predetermined temperature of at least about 485° F.

Clause 8: The component installation system of claim 7, wherein the sensor is positioned adjacent to the work-piece, and the controller is configured to monitor the sensor to detect when the annular component is heated by the heating element to the predetermined temperature, in response to which the controller is configured to control the robotic arm to move the engagement clamp and the annular component from the sensor to the installation position at the work-piece, to thereby minimize the time duration for positioning the annular component on the work-piece.

Clause 9: The component installation system of claim 8, wherein the computer-readable instructions, when executed by the processor, cause the controller to deactuate the heating element and move the robotic arm to position the engagement clamp holding the annular component to an installation position on the work-piece, and to maintain the annular component at the installation position until radial contraction of the annular component causes an interference fit between the annular component and the work-piece upon cooling of the annular component.

Clause 10: The component installation system of claim 1, wherein the annular component comprises a bushing configured to be received about the work-piece comprising a torque tube for an aircraft wheel well such that the bushing extends about the torque tube, and wherein the computer-readable instructions, when executed by the processor, cause the controller to deactuate the heating element and direct the robotic arm to move the engagement clamp to position the heated annular component at an installation position relative to the work-piece and maintain the bushing at the installation position about the torque tube until radial contraction of the bushing causes an interference fit between the bushing and the torque tube upon cooling of the bushing.

Clause 11: The component installation system of claim 5, wherein the actuator comprises a linear actuator disposed proximate the first sidewall end, having an extendable rod coupled to the second sidewall end, wherein when actuated the actuator retracts the rod to pull the first and second sidewall ends towards each other to engage the annular component.

Clause 12: A method of coupling an annular component to a work-piece using an installation system comprising a robotic arm having an engagement clamp engaged with a distal end thereof, the method comprising: actuating an actuator coupled to the engagement clamp configured to cause the engagement clamp to engage the annular component; actuating a heating element coupled to the engagement clamp to heat the annular component engaged within the engagement clamp; positioning the heated annular component by directing movement of the robotic arm with the engagement clamp at an installation position relative to the work-piece; maintaining the annular component at the installation position with the heating element deactuated, such that the annular component engages the work-piece upon cooling; and deactuating the actuator to direct the engagement clamp to disengage the annular component.

Clause 13: The method of Clause 12, further comprising: directing the movement of the robotic arm to position the engagement clamp over the annular component before the engagement clamp engages the annular component; or directing the movement of the robotic arm to move the engagement clamp away from the annular component after the engagement clamp disengages from the annular component.

Clause 14: The method of Clause 12, further comprising: coupling a controller with the robotic arm, the engagement clamp, the actuator, and the heating element, the controller comprising a processor and a memory with computer-readable instructions executable by the processor to cause the controller to control the robotic arm, the engagement clamp, the actuator, and the heating element.

Clause 15: The method of Clause 12, wherein positioning the heated annular component by directing the movement of the robotic arm with the engagement clamp at an installation position relative to the work-piece comprises positioning the heated annular component comprising a bushing, where the engagement clamp comprises an engagement collar configured to extend about the bushing, at an installation position with the bushing extending about the work-piece comprising a torque tube for an aircraft wheel well.

Clause 16: The method of Clause 12, wherein the engagement clamp is configured to extend about a circumference of the annular component, and wherein actuating the heating element comprises actuating the heating element coupled to the engagement clamp so as to heat the annular component about the circumference thereof.

Clause 17: The method of Clause 12, wherein the engagement clamp comprises a split collar having a circular sidewall with spaced-apart first and second sidewall ends, and wherein engaging the annular component comprises actuating the actuator to pull the first sidewall end toward the second sidewall end to radially reduce the split collar such that the split collar contracts about and engages the annular component.

Clause 18: The method of Clause 17, wherein directing the engagement clamp to disengage the annular component comprises deactuating the actuator to cause movement of the first sidewall end away from the second sidewall end to radially expand the split collar such that the split collar expands and disengages from the annular component.

Clause 19: The method of Clause 12, wherein actuating a heating element to heat the annular component comprises: receiving, from a sensor a signal indicative of a temperature of the annular component; and based at least in part on the signal received from the sensor, actuating the heating element to heat the annular component.

Clause 20: The method of Clause 19, wherein actuating the heating element to heat the annular component comprises controlling the heating element to heat the annular component and monitoring the sensor to detect when the annular component has been heated to a pre-determined temperature of at least 485° F.

Clause 20: The method of Clause 19, wherein actuating the heating element to heat the annular component comprises controlling the heating element to heat the annular component and monitoring the sensor to detect when the annular component has been heated to a pre-determined temperature of at least 485° F.

Clause 21: The method of Clause 20, wherein deactuating the heating element comprises deactuating the heating element and moving the robotic arm to position the engagement clamp holding the annular component to an installation position on the work-piece while maintaining the annular component at the installation position until cooling of the annular component results in radial contraction of the annular component that causes an interference fit between the annular component and the work-piece.

Clause 22: The method of Clause 12, wherein the annular component comprises a bushing configured to be received about the work-piece comprising a torque tube for an aircraft wheel well such that the bushing extends about the torque tube, and wherein deactuating the heating element comprises deactuating the heating element and directing movement of the robotic arm to move the engagement clamp to position the heated annular component at an installation position on the work-piece while maintaining the bushing at the installation position about the torque tube until cooling of the bushing results in radial contraction of the bushing and causes an interference fit between the bushing and the torque tube.

Clause 23: The method of Clause 17, wherein the actuator comprises a linear actuator disposed proximate the first sidewall end, having an extendable rod coupled to the second sidewall end, wherein actuating the actuator to disengage the annular component comprises actuating the linear actuator to retract the rod to pull the first and second sidewall ends towards each other to engage the annular component.

Many modifications and other embodiments of the inventions set forth herein will come to mind to one skilled in the art to which these disclosed embodiments pertain having the benefit of the teachings presented in the foregoing descriptions and the associated drawings. Therefore, it is to be understood that embodiments of the invention are not to be limited to the specific embodiments disclosed and that modifications and other embodiments are intended to be included within the scope of the invention. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the disclosure. In this regard, for example, different combinations of elements and/or functions than those explicitly described above are also contemplated within the scope of the disclosure. Although specific terms are employed herein, they are used in a generic and descriptive sense only and not for purposes of limitation.

It should be understood that although the terms first, second, etc. may be used herein to describe various steps or calculations, these steps or calculations should not be limited by these terms. These terms are only used to distinguish one operation or calculation from another. For example, a first calculation may be termed a second calculation, and, similarly, a second step may be termed a first step, without departing from the scope of this disclosure. As used herein, the term "and/or" and the "/" symbol includes any and all combinations of one or more of the associated listed items.

As used herein, the singular forms "a", "an" and "the" are intended to include the plural forms as well, unless the context clearly indicates otherwise. It will be further understood that the terms "comprises", "comprising", "includes", and/or "including", when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting.

The invention claimed is:

1. A component installation system, comprising:
   an engagement clamp having a circular shape coupled to a robotic arm, being configured to engage an annular component;
   an actuator coupled to the engagement clamp and operable to cause the engagement clamp to engage and disengage the annular component;
   a heating element coupled to the engagement clamp and arranged to heat the annular component engaged within the engagement clamp;
   a controller in communication with the robotic arm, the actuator and the heating element, the controller comprising a processor and a memory with computer-readable instructions, the computer-readable instructions when executed by the processor causing the controller to:
   actuate the actuator to cause the engagement clamp to engage the annular component;
   actuate the heating element to heat the annular component within the engagement clamp;
   deactuate the heating element;
   direct the robotic arm and the engagement clamp to position the heated annular component at an installation position relative to a work-piece;

maintain the annular component at the installation position with the heating element deactuated, such that the annular component engages the work-piece upon cooling; and deactuate the actuator to cause the engagement clamp to disengage the annular component.

2. The system of claim 1, wherein the computer-readable instructions, when executed by the processor, further cause the controller to:

direct the movement of the robotic arm to position the engagement clamp over the annular component before the engagement clamp engages the annular component; or direct the movement of the robotic arm to move the engagement clamp away from the annular component after the engagement clamp disengages from the annular component.

3. The system of claim 1, wherein the annular component comprises a bushing configured to be received about the work-piece comprising a torque tube for an aircraft wheel well such that the bushing extends about the torque tube, and wherein the engagement clamp comprises a collar having a circular sidewall configured to extend about the bushing.

4. The system of claim 1, wherein the engagement clamp is configured to extend about a circumference of the annular component, and wherein the heating element is coupled with the engagement clamp so as to heat the annular component about the circumference thereof.

5. The system of claim 1, wherein the engagement clamp comprises a split collar having a circular sidewall with spaced-apart first and second sidewall ends, wherein actuation of the actuator pulls the first sidewall end toward the second sidewall end to radially reduce the diameter of the split collar such that the split collar contracts about and engages the annular component, and wherein deactuation of the actuator causes movement of the first sidewall end away from the second sidewall end to radially expand the split collar such that the split collar expands and disengages from the annular component.

6. The system of claim 5, wherein the actuator comprises a linear actuator disposed proximate the first sidewall end, having an extendable rod coupled to the second sidewall end, wherein when actuated the actuator retracts the rod to pull the first and second sidewall ends towards each other to engage the annular component.

7. The system of claim 1, wherein the computer-readable instructions, when executed by the processor, further cause the controller to direct the robotic arm to move the annular component into interaction with a sensor configured to generate a signal indicative of a temperature of the annular component, and wherein the computer-readable instructions, when executed by the processor, further cause the controller to direct the heating element to heat the annular component based at least in part on the signal generated by the sensor.

8. The system of claim 7, wherein the computer-readable instructions, when executed by the processor, further cause the controller to control the heating element to heat the annular component and to monitor the sensor to detect when the annular component has been heated to a predetermined temperature of at least about 485° F.

9. The system of claim 8, wherein the sensor is positioned adjacent to the work-piece, and the controller is configured to monitor the sensor to detect when the annular component is heated by the heating element to the predetermined temperature, in response to which the controller is configured to control the robotic arm to move the engagement clamp and the annular component from the sensor to the installation position at the work-piece, to thereby minimize the time duration for positioning the annular component on the work-piece.

10. The system of claim 9, wherein the computer-readable instructions, when executed by the processor, cause the controller to deactuate the heating element and move the robotic arm to position the engagement clamp holding the annular component to the installation position on the work-piece, and to maintain the annular component at the installation position until radial contraction of the annular component causes an interference fit between the annular component and the work-piece upon cooling of the annular component.

11. The system of claim 1, wherein the annular component comprises a bushing configured to be received about the work-piece comprising a torque tube for an aircraft wheel well such that the bushing extends about the torque tube, and wherein the computer-readable instructions, when executed by the processor, cause the controller to deactuate the heating element and direct the robotic arm to move the engagement clamp to position the heated annular component at the installation position relative to the work-piece and maintain the bushing at the installation position about the torque tube until radial contraction of the bushing causes an interference fit between the bushing and the torque tube upon cooling of the bushing.

12. A method of coupling an annular component to a work-piece using an installation system comprising a robotic arm having an engagement clamp engaged with a distal end thereof, the method comprising:

actuating an actuator coupled to the engagement clamp configured to cause the engagement clamp to engage the annular component;

actuating a heating element coupled to the engagement clamp to heat the annular component engaged within the engagement clamp;

positioning the heated annular component by directing movement of the robotic arm with the engagement clamp at an installation position relative to the work-piece;

maintaining the annular component at the installation position with the heating element deactuated, such that the annular component engages the work-piece upon cooling; and deactuating the actuator to direct the engagement clamp to disengage the annular component.

13. The method of claim 12, further comprising:

directing the movement of the robotic arm to position the engagement clamp over the annular component before the engagement clamp engages the annular component; or directing the movement of the robotic arm to move the engagement clamp away from the annular component after the engagement clamp disengages from the annular component.

14. The method of claim 12, further comprising:

coupling a controller with the robotic arm, the engagement clamp, the actuator, and the heating element, the controller comprising a processor and a memory with computer-readable instructions executable by the processor to cause the controller to control the robotic arm, the engagement clamp, the actuator, and the heating element.

15. The method of claim 12, wherein positioning the heated annular component by directing the movement of the robotic arm with the engagement clamp at the installation position relative to the work-piece comprises positioning the heated annular component comprising a bushing, where the engagement clamp comprises an engagement collar configured to extend about the bushing, at an installation position with the bushing extending about the work-piece comprising a torque tube for an aircraft wheel well.

16. The method of claim 12, wherein the engagement clamp is configured to extend about a circumference of the annular component, and wherein actuating the heating element comprises actuating the heating element coupled to the engagement clamp so as to heat the annular component about the circumference thereof.

17. The method of claim 12, wherein the engagement clamp comprises a split collar having a circular sidewall with spaced-apart first and second sidewall ends, and wherein engaging the annular component comprises actuating the actuator to pull the first sidewall end toward the second sidewall end to radially reduce the split collar such that the split collar contracts about and engages the annular component.

18. The method of claim 17, wherein directing the engagement clamp to disengage the annular component comprises deactuating the actuator to cause movement of the first sidewall end away from the second sidewall end to radially expand the split collar such that the split collar expands and disengages from the annular component.

19. The method of claim 17, wherein the actuator comprises a linear actuator disposed proximate the first sidewall end, having an extendable rod coupled to the second sidewall end, wherein actuating the actuator to disengage the annular component comprises actuating the linear actuator to retract the rod to pull the first and second sidewall ends towards each other to engage the annular component.

20. The method of claim 12, wherein actuating a heating element to heat the annular component comprises:

receiving, from a sensor a signal indicative of a temperature of the annular component; and based at least in part on the signal received from the sensor, actuating the heating element to heat the annular component.

21. The method of claim 20 wherein actuating the heating element to heat the annular component comprises controlling the heating element to heat the annular component and monitoring the sensor to detect when the annular component has been heated to a pre-determined temperature of at least 485° F.

22. The method of claim 21, wherein deactuating the heating element comprises deactuating the heating element and moving the robotic arm to position the engagement clamp holding the annular component to installation position on the work-piece while maintaining the annular component at the installation position until cooling of the annular component results in radial contraction of the annular component that causes an interference fit between the annular component and the work-piece.

23. The method of claim 12 wherein the annular component comprises a bushing configured to be received about the work-piece comprising a torque tube for an aircraft wheel well such that the bushing extends about the torque tube, and wherein deactuating the heating element comprises deactuating the heating element and directing movement of the robotic arm to move the engagement clamp to position the heated annular component at the installation position on the work-piece while maintaining the bushing at the installation position about the torque tube until cooling of the bushing results in radial contraction of the bushing and causes an interference fit between the bushing and the torque tube.

* * * * *